(12) United States Patent
Wu et al.

(10) Patent No.: US 12,151,548 B2
(45) Date of Patent: Nov. 26, 2024

(54) THERMAL MANAGEMENT CONTROL METHOD AND APPARATUS, AND VEHICLE

(71) Applicant: GREAT WALL MOTOR COMPANY LIMITED, Baoding (CN)

(72) Inventors: Tong Wu, Baoding (CN); Ming Sun, Baoding (CN); Kang Hu, Baoding (CN); Ming Chen, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 0 days.

(21) Appl. No.: 18/010,382

(22) PCT Filed: Aug. 9, 2021

(86) PCT No.: PCT/CN2021/111573
§ 371 (c)(1),
(2) Date: Dec. 14, 2022

(87) PCT Pub. No.: WO2022/033438
PCT Pub. Date: Feb. 17, 2022

(65) Prior Publication Data
US 2023/0294508 A1 Sep. 21, 2023

(30) Foreign Application Priority Data
Aug. 11, 2020 (CN) .......................... 202010803407.3

(51) Int. Cl.
*B60K 11/06* (2006.01)
*B60H 1/00* (2006.01)
*B60K 11/02* (2006.01)

(52) U.S. Cl.
CPC .......... *B60K 11/06* (2013.01); *B60H 1/00807* (2013.01); *B60H 1/00849* (2013.01); *B60K 11/02* (2013.01)

(58) Field of Classification Search
CPC .......... B60K 11/06; B60K 11/02; B60K 11/00; B60H 1/00807; B60H 1/00849
See application file for complete search history.

(56) References Cited

U.S. PATENT DOCUMENTS 11,274,595 B1 * 3/2022 Farhat ...................... F01P 5/02
2024/0018895 A1 * 1/2024 Zhu ......................... F01P 11/18

FOREIGN PATENT DOCUMENTS

| CN | 104863685 | 8/2015 |
| CN | 106515428 | 3/2017 |

(Continued)

OTHER PUBLICATIONS

International Search Report for Application No. PCT/CN2021/111573, mailed Nov. 17, 2021 (4 pages).

(Continued)

*Primary Examiner* — Sizo B Vilakazi
(74) *Attorney, Agent, or Firm* — NIXON PEABODY LLP; Jeffrey L. Costellia

(57) ABSTRACT

In the method and the apparatus for thermal management and control, and the vehicle according to the present disclosure, an overtemperature threshold of the vehicle may be adjusted in off-road conditions, and/or an operating temperature of the vehicle may be obtained, and driving parameters of the vehicle may be adjusted according to the operating temperature, so as to enhance the heat dissipation performance of the vehicle in the off-road conditions, and avoid that an over-temperature protection of the engine is easily triggered when the engine is operated at a high speed and a high torque in the off-road conditions, resulting in driving experience being affected by limited torque of the engine and turn-off of an air conditioning occurring in the vehicle, and driving safety also being affected, with no high-power fan and large-size radiator being additionally (Continued)

installed, and thus reducing weight and manufacturing cost of the vehicles.

20 Claims, 5 Drawing Sheets

(56) References Cited

FOREIGN PATENT DOCUMENTS

| | | | |
|---|---|---|---|
| CN | 104863685 B | * | 2/2018 |
| CN | 108583270 B | | 9/2018 |
| CN | 108790786 | | 11/2018 |
| CN | 208486936 | | 2/2019 |
| CN | 210239829 | | 4/2020 |
| CN | 112060902 | | 12/2020 |
| JP | 2003-049646 | | 2/2003 |

OTHER PUBLICATIONS

Chinese Office Action for Application No. 202010803407.3, mailed May 17, 2021 (7 pages).
Chinese Office Action for Application No. 202010803407.3, mailed Sep. 8, 2021 (8 pages).
Extended European Search Report for App. No. 21855490.5, dated Mar. 22, 2024 (8 pages).

* cited by examiner

THERMAL MANAGEMENT CONTROL METHOD AND APPARATUS, AND VEHICLE

CROSS-REFERENCE TO RELEVANT APPLICATIONS

This application is a national phase of PCT application No. PCT/CN2021/111573, filed on Aug. 9, 2021, which claims the priority of the Chinese patent application filed on Aug. 11, 2020 before the CNIPA, China National Intellectual Property Administration with the application number of 202010803407.3 and the title of "THERMAL MANAGEMENT CONTROL METHOD AND APPARATUS, AND VEHICLE", which is incorporated herein in its entirety by reference.

TECHNICAL FIELD

The disclosure relates to the technical field of vehicles and, more particularly, to a method and an apparatus for thermal management and control.

BACKGROUND

With more and more off-road enthusiasts, application scenarios in which vehicles are driven in off-road conditions such as desert, rocks, mud and grass are becoming more and more extensive. As driving in the off-road conditions needs to cope with environment with high temperature and/or harsh road conditions, higher requirements are posed to driving performance and heat dissipation performance of the vehicles.

When the vehicles are with insufficient heat dissipation performance, over-temperature protection of an engine is easily triggered when the engine is operated at a high speed and a high torque in the off-road conditions, resulting in driving experience being affected by limited torque of the engine and turn-off of an air conditioning and in driving safety being affected. At present, in order to improve the heat dissipation performance of the vehicles, high-power fans and large-size radiators are usually disposed for the vehicles, which results in increased weight and cost of the vehicles.

SUMMARY

In view of this, the present disclosure aims at providing a method and an apparatus for thermal management and control and a vehicle, so as to solve a problem that heat dissipation performance of the vehicle is insufficient in off-road conditions and excessive in conventional road conditions.

To achieve above objectives, technical solutions of the present disclosure are implemented as follows.

When the vehicle is in the off-road condition, an adjusting step is performed to improve the heat dissipation performance of the vehicle.

The adjusting step includes following content.

An overtemperature threshold of the vehicle is reduced. The overtemperature threshold includes at least one of a starting temperature threshold of an electronic thermostat, a starting temperature threshold of an electronic water pump, a response temperature threshold of a cooling fan and a response temperature threshold of a water pump in a low-temperature circuit for a high-voltage component.

An operating temperature of the vehicle is acquired, and driving parameters of the vehicle are adjusted according to the operating temperature. The operating temperature includes at least one of an outlet water temperature of an engine and an oil temperature of a gearbox, and the driving parameters includes at least one of a duty cycle of the cooling fan, a gear of the gearbox and operating parameters of an air conditioning.

In an embodiment, the step of adjusting the driving parameters of the vehicle according to the operating temperature includes:
  when the outlet water temperature of the engine is less than or equal to a first temperature threshold, adjusting the duty cycle of the cooling fan to be a first duty cycle;
  when the outlet water temperature of the engine is greater than the first temperature threshold and less than or equal to the second temperature threshold, adjusting the duty cycle of the cooling fan to be a second duty cycle which is greater than the first duty cycle and less than a maximum duty cycle; and
  when the outlet water temperature of the engine is greater than the second temperature threshold, adjusting the duty cycle of the cooling fan to be the maximum duty cycle.

In an embodiment, the step of adjusting the driving parameters of the vehicle according to the operating temperature includes:
  when the outlet water temperature of the engine is greater than a third temperature threshold and an engine of the vehicle is a mechanical water pump, lowering the gearbox gear.

In an embodiment, the step of adjusting the driving parameters of the vehicle according to the operating temperature includes:
  when the oil temperature of the gearbox is greater than or equal to a fourth temperature threshold, lowering the gearbox gear.

In an embodiment, the operating parameters of the air conditioning include internal circulation, and the step of adjusting the driving parameters of the vehicle according to the operating temperature includes:
  when the outlet water temperature of the engine is greater than or equal to a second temperature threshold, controlling the air conditioning of the vehicle to be in internal circulation.

In an embodiment, the operating parameters of the air conditioning include an outlet temperature of an evaporator, and the step of adjusting the driving parameters of the vehicle according to the operating temperature includes:
  when the outlet water temperature of the engine is greater than or equal to a second temperature threshold, increasing the outlet temperature of the evaporator by a preset temperature value.

In an embodiment, the adjusting step further includes:
  when the vehicle is equipped with an Active Grille Shutter, adjusting an opening of the Active Grille Shutter to a maximum opening.

Compared with the prior art, the method for thermal management and control according to the present disclosure has following advantages.

In the method for thermal management and control according to the present disclosure, the overtemperature threshold of the vehicle may be adjusted in the off-road conditions, and/or the operating temperature of the vehicle may be obtained, and the driving parameters of the vehicle may be adjusted according to the operating temperature, so as to enhance the heat dissipation performance of the vehicle in the off-road conditions, and avoid that an over-temperature protection of the engine is easily triggered when the engine is operated at a high speed and a high torque in the off-road conditions, resulting in driving experience being affected by limited torque of the engine and turn-off of an air conditioning and driving safety also being affected, with no high-power fan and large-size radiator being additionally installed, and thus reducing weight and manufacturing cost of the vehicles.

Another object of the present disclosure is to provide an apparatus for thermal management and control, so as to solve a problem that heat dissipation performance of the vehicle is insufficient in off-road conditions and excessive in conventional road conditions.

To achieve above objectives, technical solutions of the present disclosure are implemented as follows.

An apparatus for thermal management and control, one or more processors and a storage apparatus; and the storage apparatus stores a computer program which, when executed by the processor, perform the operations including:

when a vehicle is in an off-road condition, performing an adjusting step to improve heat dissipation performance of the vehicle;

wherein the adjusting step includes at least one of steps as follows:

reducing an overtemperature threshold of the vehicle, and the overtemperature threshold includes at least one of a starting temperature threshold of an electronic thermostat, a starting temperature threshold of an electronic water pump, a response temperature threshold of a cooling fan and a response temperature threshold of a water pump in a low-temperature circuit for a high-voltage component; and acquiring an operating temperature of the vehicle, and adjusting driving parameters of the vehicle according to the operating temperature, wherein the operating temperature includes at least one of an outlet water temperature of an engine and an oil temperature of a gearbox and the driving parameters includes at least one of a duty cycle of the cooling fan, a gear of the gearbox and operating parameters of an air conditioning.

In an embodiment, the operation of adjusting the driving parameters of the vehicle according to the operating temperature includes:

when the outlet water temperature of the engine is less than or equal to a first temperature threshold, adjusting the duty cycle of the cooling fan to be a first duty cycle;

when the outlet water temperature of the engine is greater than the first temperature threshold and less than or equal to the second temperature threshold, adjusting the duty cycle of the cooling fan to be a second duty cycle which is greater than the first duty cycle and less than a maximum duty cycle; and when the outlet water temperature of the engine is greater than the second temperature threshold, adjusting the duty cycle of the cooling fan to be the maximum duty cycle.

In an embodiment, the operation of adjusting the driving parameters of the vehicle according to the operating temperature includes:

when the outlet water temperature of the engine is greater than a third temperature threshold and an engine of the vehicle is a mechanical water pump, lowering the gearbox gear.

In an embodiment, the operation of adjusting the driving parameters of the vehicle according to the operating temperature includes:

when the oil temperature of the gearbox is greater than or equal to a fourth temperature threshold, lowering the gearbox gear.

Compared with the related art, the apparatus for thermal management and control has the same advantages as the method for thermal management and control, which will not be repeatedly described herein again.

A vehicle is further provided in the present disclosure, wherein the vehicle is equipped with the apparatus for thermal management and control described above.

In an embodiment, the step of adjusting the driving parameters of the vehicle according to the operating temperature comprises:

when the outlet water temperature of the engine is less than or equal to a first temperature threshold, adjusting the duty cycle of the cooling fan to be a first duty cycle;

when the outlet water temperature of the engine is greater than the first temperature threshold and less than or equal to the second temperature threshold, adjusting the duty cycle of the cooling fan to be a second duty cycle which is greater than the first duty cycle and less than a maximum duty cycle; and when the outlet water temperature of the engine is greater than the second temperature threshold, adjusting the duty cycle of the cooling fan to be the maximum duty cycle.

In an embodiment, the step of adjusting the driving parameters of the vehicle according to the operating temperature comprises:

when the outlet water temperature of the engine is greater than a third temperature threshold and an engine of the vehicle is a mechanical water pump, lowering the gearbox gear.

In an embodiment, the step of adjusting the driving parameters of the vehicle according to the operating temperature comprises:

when the oil temperature of the gearbox is greater than or equal to a fourth temperature threshold, lowering the gearbox gear.

In an embodiment, the operating parameters of the air conditioning comprise internal circulation, and the step of adjusting the driving parameters of the vehicle according to the operating temperature comprises:

when the outlet water temperature of the engine is greater than or equal to a second temperature threshold, controlling the air conditioning of the vehicle to be in internal circulation.

In an embodiment, the operating parameters of the air conditioning comprise an outlet temperature of an evaporator, and the step of adjusting the driving parameters of the vehicle according to the operating temperature comprises:

when the outlet water temperature of the engine is greater than or equal to a second temperature threshold, increasing the outlet temperature of the evaporator by a preset temperature value.

In an embodiment, the adjusting step further comprises:

when the vehicle is equipped with an Active Grille Shutter, adjusting an opening of the Active Grille Shutter to a maximum opening.

The present disclosure further provides a computer-readable medium, wherein the computer-readable medium stores a computer-readable code, and when the computer-readable code is executed, the method for thermal management and control stated above is performed.

In an embodiment, the step of adjusting the driving parameters of the vehicle according to the operating temperature comprises:

when the outlet water temperature of the engine is less than or equal to a first temperature threshold, adjusting the duty cycle of the cooling fan to be a first duty cycle;

when the outlet water temperature of the engine is greater than the first temperature threshold and less than or equal to the second temperature threshold, adjusting the duty cycle of the cooling fan to be a second duty cycle which is greater than the first duty cycle and less than a maximum duty cycle; and when the outlet water temperature of the engine is greater than the second temperature threshold, adjusting the duty cycle of the cooling fan to be the maximum duty cycle.

Compared with the related art, the vehicle has the same advantages as the method for thermal management and control, which will not be repeatedly described herein again.

The above description is only a summary of technical schemes of the present disclosure, which may be implemented according to contents of the specification in order to better understand technical means of the present disclosure; and in order to make above and other objects, features and advantages of the present disclosure more obvious and understandable, detailed description of the present disclosure is particularly provided in the following.

BRIEF DESCRIPTION OF THE DRAWINGS

The drawings which form a part of the present disclosure, are used to provide a further understanding of the present disclosure. Illustrative embodiments of the present disclosure and their descriptions are intended to explain the present disclosure, and not constructed as undue limitations on the present disclosure. In the drawings.

DETAILED DESCRIPTION OF THE EMBODIMENTS

In order to make purposes, technical schemes and advantages of embodiments of the present disclosure more clearly, the technical schemes in the embodiments of the present disclosure will be described clearly and completely with reference to the drawings in the embodiments of the present disclosure; and it is obvious that the described embodiments are part of the embodiments of the present disclosure, but not all of them. On a basis of the embodiments in the present disclosure, all other embodiments obtained by the ordinary skilled in the art without paying creative effort are within a protection scope of the present disclosure.

It should be noted that the embodiments in the present disclosure and the characteristics in the embodiments may be combined mutually in the case of no conflict.

The present disclosure will be described in details with reference to drawings and in combination with embodiments.

Figure 1:
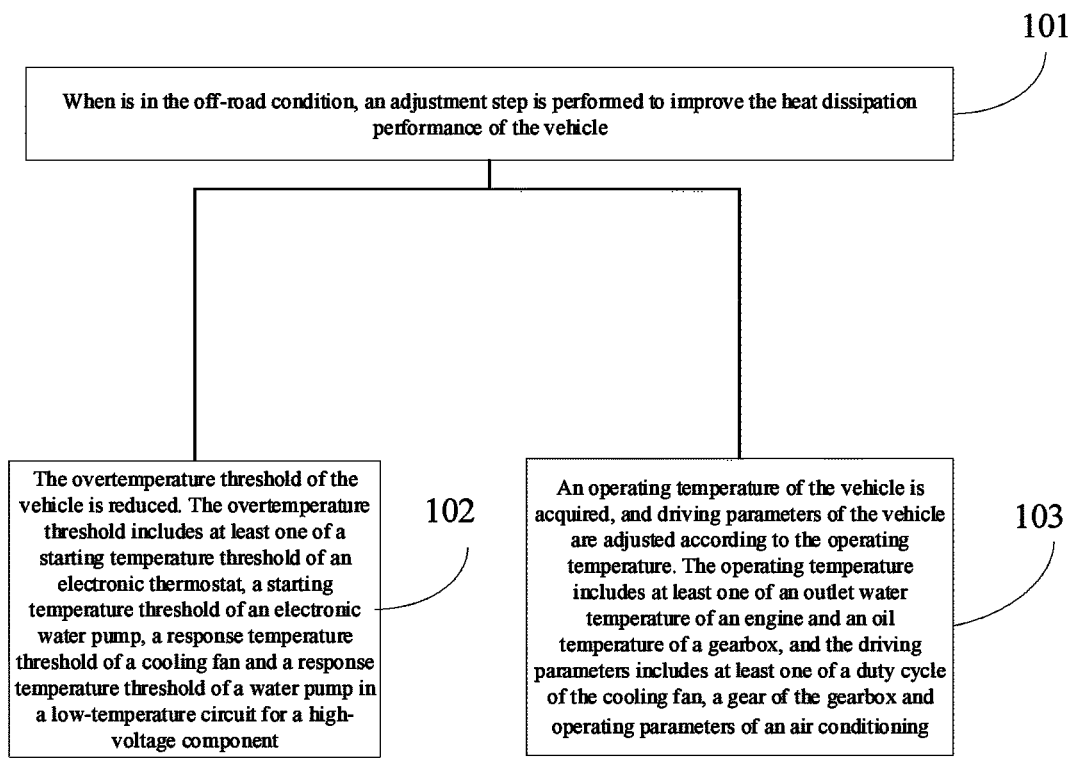
FIG. 1 is a flow chart of steps of a method for thermal management and control according to an embodiment of the present disclosure.

FIG. 1 is a flow chart of steps of a method for thermal management and control according to an embodiment of the present disclosure. As shown in FIG. 1, the method may include step 101 and 103.

In Step 101, when the vehicle is in the off-road condition, an adjusting step is performed to improve the heat dissipation performance of the vehicle.

In the embodiment of the present disclosure, when the vehicle is in conventional road conditions, such as driving on urban roads, suburban roads, highways, etc., because high heat dissipation performance is not required for the conventional road conditions, the vehicle may be with low heat dissipation performance, thus avoiding excessive heat dissipation performance. When the vehicle is in off-road conditions, the heat dissipation performance of the vehicle may be increased through the adjusting step, so that the heat dissipation of the vehicle may be adapted to requirements of the off-road conditions and may be adapted to harsh driving environment in the off-road conditions. Optionally, the heat dissipation performance of the vehicle may be reduced in the conventional road conditions to avoid excessive heat dissipation performance. For example, in the conventional road conditions, the heat dissipation performance of the vehicle may be reduced by reversely performing the adjusting step.

In the embodiment of the present disclosure, it may be determined for the vehicle whether the vehicle is in the off-road condition, through driver's operations. For example, a driver's operation of activating an off-road mode of the vehicle is received, and the vehicle is determined to be in the off-road condition according to this operation. It may be that a selection operation of the off-road mode by the driver on an on-board computer of the vehicle may be received, or it may be an input operation of "opening the off-road mode" by the driver through a voice input. It also may be determined for the vehicle whether the vehicle is in the off-road condition through map information. For example, a real-time position of the vehicle may be obtained, and it may be determined whether the map information of the vehicle indicates the off-road condition according to the real-time position. Optionally, it may be determined that the vehicle is in the off-road condition when the map information of the vehicle indicates desert, mud, grass and other road conditions. It also may be determined for the vehicle whether it is in off-road conditions through collected environmental information. Optionally, the environmental information may include a temperature, visibility, rainfall, road obstacles, etc.

Optionally, the adjusting step includes at least one of steps as follows:

In Step 102, an overtemperature threshold of the vehicle is reduced. The overtemperature threshold includes at least one of a starting temperature threshold of an electronic thermostat, a starting temperature threshold of an electronic water pump, a response temperature threshold of a cooling fan and a response temperature threshold of a water pump in a low-temperature circuit for a high-voltage component.

In the embodiment of the present disclosure, the overtemperature threshold refers to a threshold for overtemperature protection of the vehicle. When a temperature of a specified component of the vehicle is greater than or equal to the overtemperature threshold, the overtemperature protection may be carried out on the vehicle, wherein the overtemperature protection may be to increase a flow of engine coolant, a flow of coolant in a low-temperature circuit, or the like, so that heat may be dissipated in time when the vehicle is operated in the off-road conditions and its temperature is abruptly increased due to increased power, thus preventing the corresponding components from being damaged due to overtemperature caused by untimely heat dissipation. By adjusting the overtemperature threshold, starting time of the overtemperature protection may be adjusted, and the overtemperature protection may be started at right time by adjusting the overtemperature threshold, thus improving the heat dissipation performance of the vehicle.

In the embodiment of the present disclosure, the overtemperature protection may be started in advance by lowering the overtemperature threshold, so as to improve the heat dissipation performance of the vehicle. Optionally, the starting temperature threshold of the electronic thermostat and the starting temperature threshold of the electronic water pump may be lowered, so that a large cycle may be started in advance for a cooling circuit of the engine. The flow of coolant flowing through a radiator may be increased, so that heat dissipation rate of the engine may be improved and the heat dissipation performance of the vehicle may be improved, and poor heat dissipation of the engine due to abrupt increase of a temperature of the engine coolant and slow response of the electronic thermostat and the electronic water pump when the vehicle is driven aggressively in the off-road condition may be avoided. It may also be that the response temperature threshold of the water pump in the low-temperature circuit for the high-voltage component may be lowered, so that the water pump in the low-temperature circuit for the high-voltage component may respond in advance, a heat dissipation rate of the high-voltage component may be improved, and it may be prevented that the high-voltage component is quickly charged and discharged, power is increased, a coolant temperature of the low-temperature circuit is abruptly increased, and the high-voltage component is damaged due to overtemperature in aggressive driving of the vehicle. It also may be that the response temperature threshold of the cooling fan may be lowered, which is a temperature threshold for starting the electronic fan used to cool the engine in the vehicle. By reducing the response temperature threshold of the cooling fan, the electronic fan may be started in advance to improve the heat dissipation performance of the vehicle. According to specific configuration and driving environment of the vehicle, the overtemperature protection that starts in advance may be selected by the skilled in the art to improve the heat dissipation performance of the vehicle. Optionally, the high-voltage component of the vehicle may include a motor, a motor controller, an On-board charger (OBC)/a Direct Current Direct Current (DCDC) converter or the like.

In Step 103, an operating temperature of the vehicle is acquired, and driving parameters of the vehicle are adjusted according to the operating temperature. The operating temperature includes at least one of an outlet water temperature of an engine and an oil temperature of a gearbox, and the driving parameters includes at least one of a duty cycle of a cooling fan, a gear of the gearbox and operating parameters of an air conditioning.

In the embodiment of the present disclosure, the operating temperature of the vehicle may also be obtained. Optionally, the operating temperature may be the outlet water temperature of the engine, which refers to an outlet temperature of a circulation circuit where the engine coolant cools the engine. The engine temperature after cooled by the coolant may be further determined through the outlet water temperature of the engine. The operating temperature may also include the oil temperature of the gearbox, and the gearbox is a mechanism used to change a rotational speed and torque from the engine, and the gearbox may be kept operating normally and service life of the mechanism may be extended by the oil. The oil temperature of the gearbox is a temperature of oil in an operating process of the gearbox, which may be obtained by an oil temperature sensor of the gearbox. As the engine or the gearbox may be seriously damaged if the outlet water temperature of the engine or the oil temperature of the gearbox is too high in operations of the engine, the driving parameters of the vehicle may be adjusted according to the outlet water temperature of the engine or the oil temperature of the gearbox to improve the heat dissipation performance of the vehicle. Optionally, the driving parameters may include the duty cycle of the cooling fan, the gear of the gearbox and the operating parameters of the air conditioning. Other operating temperatures may be selected by those skilled in the art according to specific specifications and performance of the vehicle, which is not specifically limited in the embodiment of the present disclosure.

Figure 2:
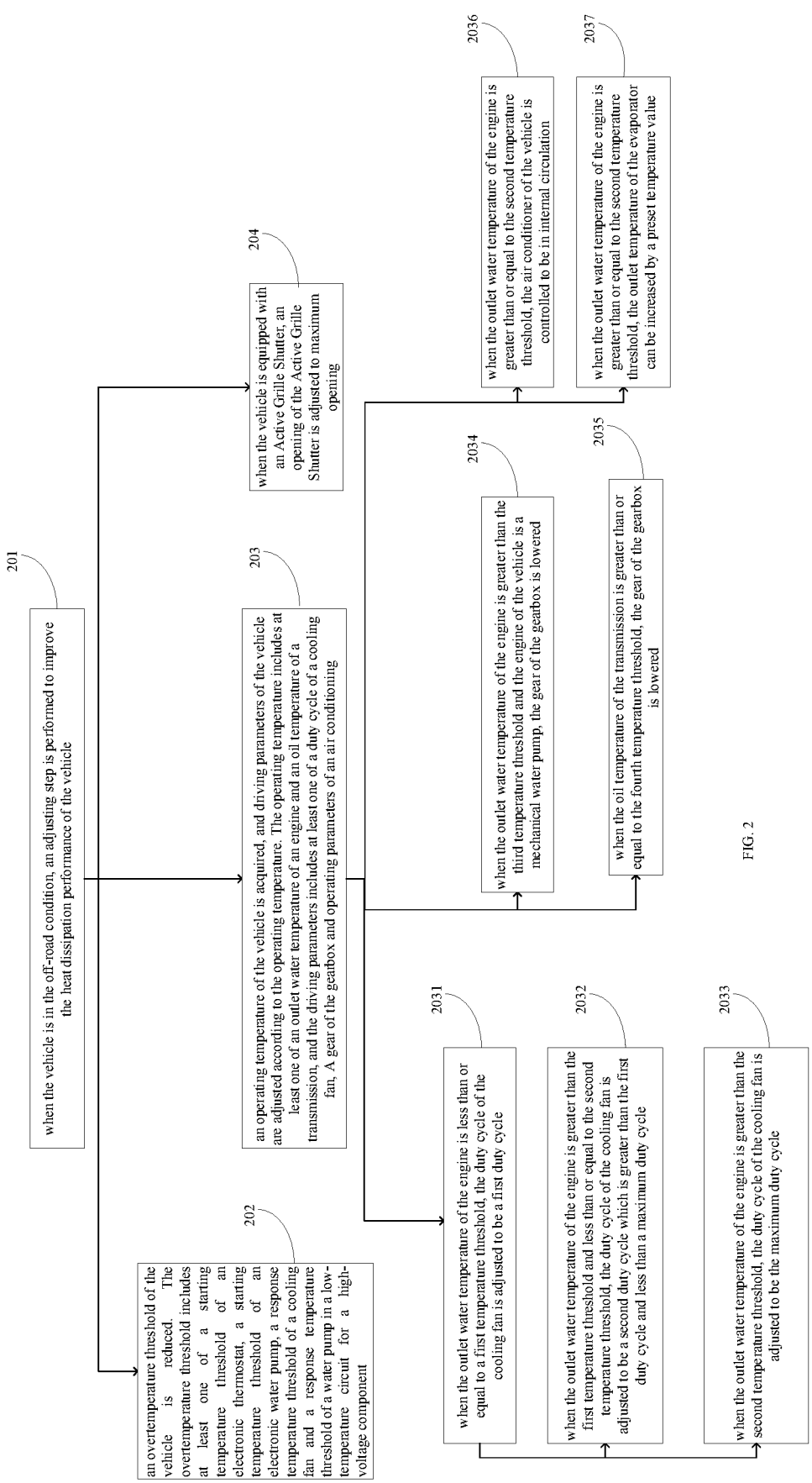
FIG. 2 is a flow chart of steps of another method for thermal management and control according to an embodiment of the present disclosure.

FIG. 2 is a flow chart of steps of another method for thermal management and control according to an embodiment of the present disclosure. As shown in FIG. 2, the method may include step 201 and 204.

In Step 201, when the vehicle is in the off-road condition, an adjusting step is performed to improve the heat dissipation performance of the vehicle.

In the embodiment of the present disclosure, content of the step 201 may correspondingly be referred to related description of step 101, which will not be repeatedly described here to avoid repetition.

The adjusting step includes at least one of steps as follows:

In Step 202, an overtemperature threshold of the vehicle is reduced. The overtemperature threshold includes at least one of a starting temperature threshold of an electronic thermostat, a starting temperature threshold of an electronic water pump, a response temperature threshold of a cooling fan and a response temperature threshold of a water pump in a low-temperature circuit for a high-voltage component.

In the embodiment of the present disclosure, content of the step 202 may correspondingly be referred to related description of step 102 described above, which will not be repeatedly described here to avoid repetition.

In Step 203, an operating temperature of the vehicle is acquired, and driving parameters of the vehicle are adjusted according to the operating temperature. The operating temperature includes at least one of an outlet water temperature of an engine and an oil temperature of a gearbox, and the driving parameters includes at least one of a duty cycle of a cooling fan, a gear of the gearbox and operating parameters of an air conditioning.

In the embodiment of the present disclosure, the step 203 may correspondingly be referred to related description of step 103 described above, which will not be repeatedly described here to avoid repetition.

Optionally, the driving parameters include the duty cycle of the cooling fan, and the step 203 includes steps 2031 to 2033.

In step 2031, when the outlet water temperature of the engine is less than or equal to a first temperature threshold, the duty cycle of the cooling fan is adjusted to be a first duty cycle.

In step 2032, when the outlet water temperature of the engine is greater than the first temperature threshold and less than or equal to the second temperature threshold, the duty cycle of the cooling fan is adjusted to be a second duty cycle which is greater than the first duty cycle and less than a maximum duty cycle.

In step 2033, when the outlet water temperature of the engine is greater than the second temperature threshold, the duty cycle of the cooling fan is adjusted to be the maximum duty cycle.

In the embodiment of the disclosure, the duty cycle of the cooling fan refers to a ratio of power-on time in an operating cycle of an electronic fan used to cool the engine to an operating cycle. Generally, the larger the duty cycle, the faster a rotation speed of the electronic fan. Different duty cycles of the cooling fan may be selected according to the outlet water temperature of the engine, so that different heat dissipation power may be selected for different outlet water temperature of the engines. Optionally, when the outlet water temperature of the engine is less than the first temperature threshold, the first duty cycle may be selected, and at this time the electronic fan does not rotate or rotates slowly. When the outlet water temperature of the engine is greater than the first temperature threshold and less than or equal to the second temperature threshold, the duty cycle of the cooling fan is adjusted to be the second duty cycle, and the second duty cycle is between the first duty cycle and the maximum duty cycle. At this time, the second temperature threshold is greater than the first temperature threshold, and the rotating speed of the electronic fan is large but less than a maximum rotating speed of the electronic fan. When the outlet water temperature of the engine is greater than the second temperature threshold, it may be considered that the outlet water temperature of the engine is high. At this time, the duty cycle of the cooling fan may be adjusted to the maximum duty cycle, and the heat may be dissipated with the maximum rotation speed of the electronic fan. On the basis that the duty cycle of the cooling fan is increased with increased outlet water temperature of the engine, the temperature threshold may be set by those skilled in the art according to actual needs, which is not specifically limited in the embodiment of the present disclosure.

In the embodiment of the disclosure, sizes of the first temperature threshold and the second temperature threshold are not limited, but may be set according to performance indicators of the vehicle, and calibrated in an actual driving process or experiments of the vehicle so as to adapt to actual driving situations. For example, with a highest temperature resistance of the engine of 113° C., the first temperature threshold may be 85° C., the second temperature threshold may be 95° C., the first duty cycle may be 10%, the second duty cycle may be 60% and the maximum duty cycle may be 85%. At this time, when the outlet water temperature of the engine is less than or equal to 85° C., the duty cycle of the cooling fan is adjusted to be 10%; when the outlet water temperature of the engine is greater than 85° C. and less than or equal to 95° C., the duty cycle of the cooling fan is adjusted to be 60%; and when the outlet water temperature of the engine is greater than 95° C., the duty cycle of cooling fan is adjusted to be 85%. According to the specific performance indicators of the vehicle, when the maximum temperature resistance of the engine is 120° C., the first temperature threshold may be 90° C., the second temperature threshold may be 110° C., which is limited in the embodiment of the present disclosure.

Optionally, the driving parameters include the gear of the gearbox, and the step 203 includes steps 2034 and 2035.

In step 2034, when the outlet water temperature of the engine is greater than the third temperature threshold and the engine of the vehicle is a mechanical water pump, the gear of the gearbox is lowered.

In practical applications, the gear of the gearbox refers to a driving condition that may be realized by a gearbox driveline mechanism and a control mechanism. The more the gears of the gearbox are, the better adaptability of the vehicle to driving conditions and the lower the fuel consumption is, which also makes operations difficult and is with high cost. Among the gears of the gearbox, the gear with a small number is a low gear, which provides a large gearbox ratio, a large traction force and a small vehicle speed. The gear with a large number is a high gear, which provides a small gearbox ratio, a small traction force and a large vehicle speed. In the embodiment of the present disclosure, when the outlet water temperature of the engine is great than the third temperature threshold and the engine is a mechanical water pump, the gear of the gearbox is lowered to reduce a speed of the vehicle, so that the engine speed is increased, the flow of the engine coolant is increased, and the heat dissipation of the engine is improved.

For example, with a maximum temperature resistance of the engine of 113° C., the third temperature threshold may be 110° C., and when the outlet water temperature of the engine is greater than 110° C. and the engine is the mechanical water pump, the gear of the gearbox is lowered.

In step 2035, when the oil temperature of the gearbox is greater than or equal to the fourth temperature threshold, the gear of the gearbox is lowered.

In the embodiment of the disclosure, when the oil temperature of the gearbox is greater than or equal to the fourth temperature threshold, it may be considered that a structure of the gearbox may be damaged by the oil temperature of the gearbox. At this time, the gear of the gearbox may be lowered, thereby reducing heat of the gearbox that needs to be radiated, reducing load of an oil cooler and improving the heat dissipation of the vehicle. Optionally, the fourth temperature threshold may be any temperature value between 90° C. and 100° C., which is not limited in the embodiment of the present disclosure.

Optionally, the driving parameters include the operating parameters of the air conditioning, and the operating parameters of the air conditioning include internal circulation. The step 203 includes step 2036 and 2037.

In step 2036, when the outlet water temperature of the engine is greater than or equal to the second temperature threshold, the air conditioning of the vehicle is controlled to be in internal circulation.

In the embodiment of the present disclosure, the driving parameters may also include the operating parameters of the air conditioning. The operating parameters of the air conditioning may be a circulation mode of the air conditioning. For example, the air conditioning is in internal circulation or external circulation, etc. When the outlet water temperature of the engine is greater than or equal to the third temperature threshold, the air conditioning of the vehicle may be controlled to switch to the internal circulation or keep the internal circulation, so as to avoid indoor heat loss of the vehicle, reduce air conditioning load of the vehicle, improve the heat dissipation performance of the vehicle.

Optionally, the driving parameters include the operating parameters of the air conditioning, and the operating parameters of the air conditioning include an outlet temperature of an evaporator. The step 203 includes step 2036 and 2037.

In step 2037, when the outlet water temperature of the engine is greater than or equal to the second temperature threshold, the outlet temperature of the evaporator may be increased by a preset temperature value.

In the embodiment of the disclosure, the operating parameters of the air conditioning may also include the outlet temperature of the evaporator, and the evaporator is one of refrigeration components in the vehicle. Low-temperature liquid exchanges heat with outside air through the evaporator, and vaporizes and absorbs heat to achieve refrigeration effect. Increasing the outlet temperature of the evaporator may reduce refrigeration output power of the evaporator, thus reducing loads of a compressor, a condenser and the like of the air conditioning, thus reducing an intake air temperature of the radiator and reducing the engine load. Optionally, the preset temperature value may be 1° C., 2° C., 3° C., 4° C. and 5° C., which is not limited in the embodiment of the present disclosure. Other ways to adjust the operating parameters of the air conditioning may be adopted by those skilled in the art to reduce load of an air conditioned vehicle, which is not limited in the embodiment of the present disclosure.

In step 204, when the vehicle is equipped with an Active Grille Shutter, an opening of the Active Grille Shutter is adjusted to maximum opening.

In the embodiment of the disclosure, the Active Grille Shutter (AGS) is a grille opening installed in front of the radiator of the vehicle and has blades that may rotate by 90 degrees, so that opening of the blades may be adjusted according to the outlet water temperature of the engine. In the off-road conditions, the opening of the Active Grille Shutter may be adjusted to the maximum opening. For example, when the maximum opening of the Active Grille Shutter is 90°, the opening of the blades may be adjusted to be 90°, so as to increase intake air volume of the vehicle, thus ensuring maximum heat dissipation of the radiator and improving the heat dissipation performance of the vehicle.

In the method for thermal management and control according to the present disclosure, the overtemperature threshold of the vehicle may be adjusted in the off-road conditions, and/or the operating temperature of the vehicle may be obtained, and the driving parameters of the vehicle may be adjusted according to the operating temperature, so as to enhance the heat dissipation performance of the vehicle in the off-road conditions, and avoid that an over-temperature protection of the engine is easily triggered when the engine is operated at a high speed and a high torque in the off-road conditions, resulting in driving experience being affected by limited torque of the engine and turn-off of an air conditioning and driving safety also being affected, with no high-power fan and large-size radiator being additionally installed, and thus reducing weight and manufacturing cost of the vehicles.

Figures 3, 4:
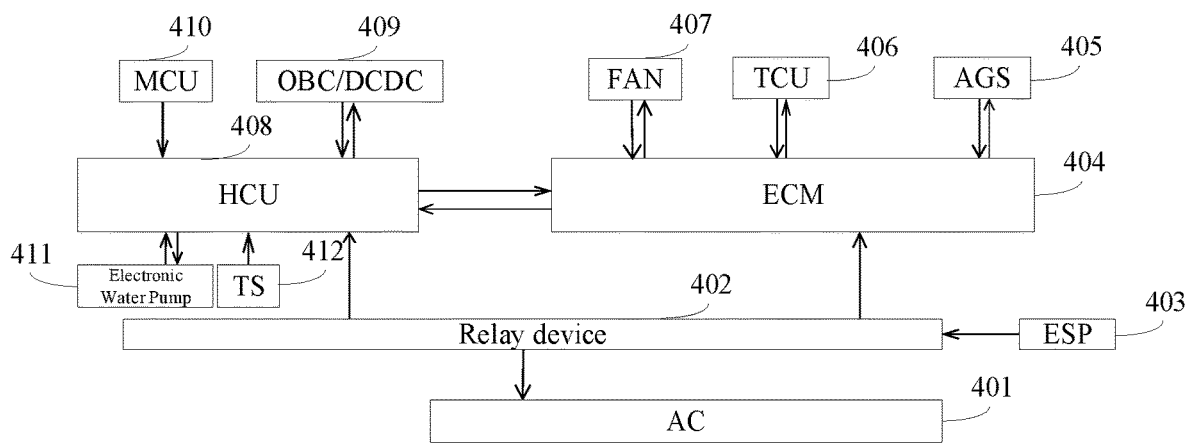
FIG. 3 is a structural block diagram of an apparatus for thermal management and control according to an embodiment of the present disclosure.
FIG. 4 is a schematic structural diagram of a vehicle hardware according to an embodiment of the present disclosure.

FIG. 3 is a structural block diagram of an apparatus for thermal management and control according to an embodiment of the present disclosure. As shown in FIG. 3, the apparatus may include an off-road adjusting module 301.

The off-road adjusting module 301 is configured to when the vehicle is in an off-road condition, an adjusting submodule is performed to improve heat dissipation performance of a vehicle.

The off-road adjusting module 301 includes at least one of a temperature adjusting submodule and a driving parameter adjusting submodule.

The temperature adjusting submodule 3011 is configured to reduce an overtemperature threshold of the vehicle. The overtemperature threshold includes at least one of a starting temperature threshold of an electronic thermostat, a starting temperature threshold of an electronic water pump, a response temperature threshold of a cooling fan and a response temperature threshold of a water pump in a low-temperature circuit for a high-voltage component.

The driving parameter adjusting submodule 3012 is configured to acquire an operating temperature of the vehicle, and to adjust driving parameters of the vehicle according to the operating temperature. The operating temperature includes at least one of an outlet water temperature of an engine and an oil temperature of a gearbox, and the driving parameters includes at least one of a duty cycle of a cooling fan, a gear of the gearbox and operating parameters of an air conditioning.

Optionally, the driving parameter adjusting submodule 3012 includes a first fan adjusting unit, a second fan adjusting unit and a third fan adjusting unit.

The first fan adjusting unit is configured to, when the outlet water temperature of the engine is less than or equal to a first temperature threshold, adjust the duty cycle of the cooling fan to be a first duty cycle.

The second fan adjust unit is configured to, when the outlet water temperature of the engine is greater than the first temperature threshold and less than or equal to the second temperature threshold, adjust the duty cycle of the cooling fan to be a second duty cycle which is greater than the first duty cycle and less than a maximum duty cycle.

The third fan adjusting unit is configured to, when the outlet water temperature of the engine is greater than the second temperature threshold, adjust the duty cycle of the cooling fan to be the maximum duty cycle.

Optionally, the driving parameter adjusting submodule 3012 is specifically configured to, when the outlet water temperature of the engine is greater than the third temperature threshold and the engine of the vehicle is a mechanical water pump, lower the gearbox gear.

Optionally, the driving parameter adjusting submodule 3012 is specifically configured to, when the oil temperature of the gearbox is greater than or equal to the fourth temperature threshold, lower the gearbox gear.

Optionally, the operating parameters of the air conditioning include internal circulation, and the driving parameter adjusting submodule 3012 is specifically configured to control the air conditioning of the vehicle to be in internal circulation when the outlet water temperature of the engine is greater than or equal to the second temperature threshold.

Optionally, the operating parameters of the air conditioning include an outlet temperature of an evaporator, and the driving parameter adjusting submodule 3012 is specifically configured to, when the outlet water temperature of the engine is greater than or equal to the second temperature threshold, increase the outlet temperature of the evaporator by a preset temperature value.

Optionally, the off-road adjusting module 301 further includes an opening adjusting submodule.

The opening adjusting submodule is configured to adjust opening of an Active Grille Shutter to a maximum opening when the vehicle is equipped with the Active Grille Shutter.

In the apparatus for thermal management and control according to the present disclosure, the overtemperature threshold of the vehicle may be adjusted in the off-road conditions, and/or the operating temperature of the vehicle may be obtained, and the driving parameters of the vehicle may be adjusted according to the operating temperature, so as to enhance the heat dissipation performance of the vehicle in the off-road conditions, and avoid that an over-temperature protection of the engine is easily triggered when the engine is operated at a high speed and a high torque in the off-road conditions, resulting in driving experience being affected by limited torque of the engine and turn-off of an air conditioning and driving safety also being affected, with no high-power fan and large-size radiator being additionally installed, and thus reducing weight and manufacturing cost of the vehicles.

A vehicle is further provided in an embodiment of the present disclosure, which may be used to realize the method for thermal management and control shown in FIGS. 1 to 2, or may be equipped with the apparatus for thermal management and control shown in FIG. 3.

FIG. 4 shows a schematic diagram of a vehicle hardware structure according to an embodiment of the present disclosure. As shown in FIG. 4, the vehicle may include an AC (Air conditioning) system controller 401, a relay device 402, an Electronic stability program (ESP) 403, an Engine Control Module (ECM) 404, an AGS 405, a Gearbox Control Unit (TCU) 406, an electronic fan (FAN) 407, a Hybrid Control Unit (HCU) 408, an OBC/DCDC 409, a Motor Control Unit (MCU) 410, an electronic water pump 411, a Temperature Sensor (TS) 412. Optionally, the MCU 410 may control motors at any position in the vehicle, including a motor P0, a motor P1, a motor P2, etc.

Figure 5:
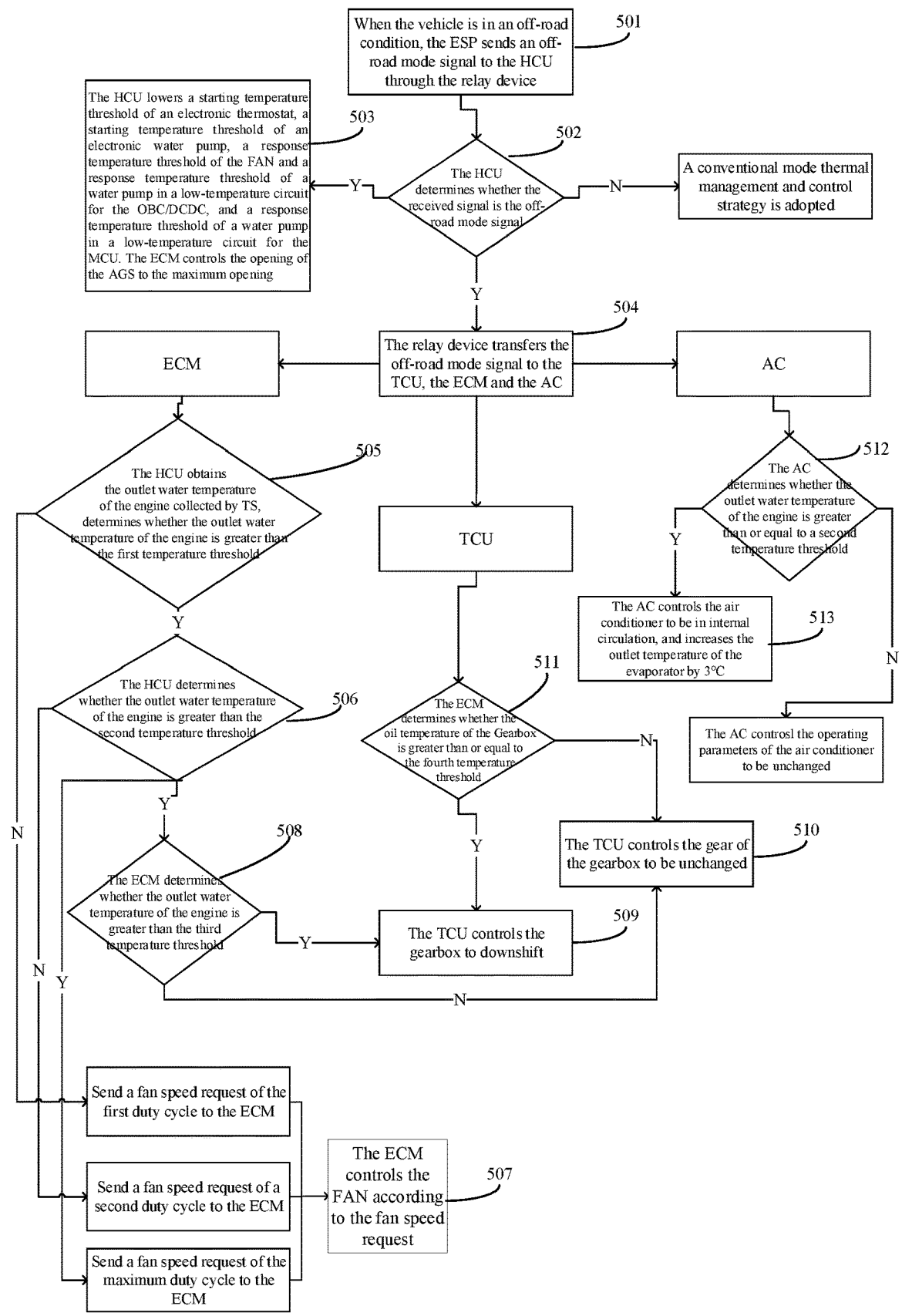
FIG. 5 is a diagram of a specific example of a method for thermal management and control according to an embodiment of the present disclosure.

FIG. 5 is a diagram of a specific example of a method for thermal management and control according to an embodiment of the present disclosure. As shown in FIG. 5, steps to realize the method for thermal management and control through the vehicle hardware structure shown in FIG. 4 are as follows, where "Y" means yes and "N" means no.

In step 501, when the vehicle is in an off-road condition, the ESP 403 sends an off-road mode signal to the HCU 408 through the relay device 402.

In step 502, the HCU 408 determines whether the received signal is the off-road mode signal, and if the received signal is the off-road mode signal, steps 503 and 504 are executed. If the received signal is not the off-road mode signal, a conventional mode thermal management and control strategy is adopted.

In step 503, the HCU 408 lowers a starting temperature threshold of an electronic thermostat, a starting temperature threshold of an electronic water pump 411, a response temperature threshold of the FAN 407 and a response temperature threshold of a water pump in a low-temperature circuit for the OBC/DCDC 409, and a response temperature threshold of a water pump in a low-temperature circuit for the MCU 410. The ECM 404 controls the opening of the AGS 405 to the maximum opening.

In step 504, the relay device 402 transfers the off-road mode signal to the TCU 406, the ECM 404 and the AC 401.

In step 505, the HCU 408 obtains the outlet water temperature of the engine collected by TS 412, determines whether the outlet water temperature of the engine is greater than the first temperature threshold, sends a fan speed request of the first duty cycle to the ECM 404 if the outlet water temperature of the engine is not greater than the first temperature threshold, and executes step 506 if the outlet water temperature of the engine is greater than the first temperature threshold.

In the step 506, the HCU 408 determines whether the outlet water temperature of the engine is greater than the second temperature threshold, sends a fan speed request with a second duty cycle to the ECM 404 if the outlet water temperature of the engine is not greater than the second temperature threshold, and sends a fan speed request of the maximum duty cycle to the ECM 404 if the outlet water temperature of the engine is greater than the second temperature threshold. The second duty cycle is larger than the first duty cycle and smaller than the maximum duty cycle.

In step 507, the ECM 404 controls the FAN 407 according to the fan speed request.

In step 508, the ECM 404 determines whether the outlet water temperature of the engine is greater than the third temperature threshold, and executes step 509 if the outlet water temperature of the engine is greater than the third temperature threshold; and executes step 510 if the outlet water temperature of the engine is not greater than the third temperature threshold.

In step 509, the TCU 408 controls the gearbox to downshift.

In step 510, the TCU 408 controls the gear of the gearbox to be unchanged.

In step 511, the TCU 408 determines whether the oil temperature of the gearbox is greater than or equal to the fourth temperature threshold, and executes step 509 if the oil temperature of the gearbox is greater than or equal to the fourth temperature threshold; and executes step 510 if the oil temperature of the gearbox is not greater than and equal to the fourth temperature threshold.

In step 512, the AC 401 determines whether the outlet water temperature of the engine is greater than or equal to a second temperature threshold, and executes step 512 if the outlet water temperature of the engine is greater than or equal to the second temperature threshold; and controls the operating parameters of the air conditioning to be unchanged if the outlet water temperature of the engine is not greater than and equal to the second temperature threshold.

In step 513, the AC 401 controls the air conditioning to be in internal circulation, and increases the outlet temperature of the evaporator by 3° C.

In the embodiment of the disclosure, the conventional mode thermal management control strategy is a thermal management method with low heat dissipation performance when the vehicle is operated in conventional road conditions. Optionally, with the conventional mode management control strategy, the heat dissipation performance of the vehicle may be reduced by increasing the overtemperature threshold, controlling the air conditioning to be in external circulation, lowering the outlet temperature of the evaporator, etc. on a basis of the above thermal management method in the off-road conditions, so as to adapt to low heat dissipation requirements of the conventional road conditions and avoid excessive heat dissipation performance of the vehicle.

In the embodiment of the present disclosure, the components in the vehicle hardware structure described above only serve as examples, and in practical applications, the components in the hardware structure may be added or removed as desired.

In the vehicle according to the present disclosure, the overtemperature threshold of the vehicle may be adjusted in the off-road conditions, and/or the operating temperature of the vehicle may be obtained, and the driving parameters of the vehicle may be adjusted according to the operating temperature, so as to enhance the heat dissipation performance of the vehicle in the off-road conditions, and avoid that an over-temperature protection of the engine is easily triggered when the engine is operated at a high speed and a high torque in the off-road conditions, resulting in driving experience being affected by limited torque of the engine and turn-off of an air conditioning and driving safety also being affected, with no high-power fan and large-size radiator being additionally installed, and thus with reducing weight and manufacturing cost of the vehicles.

The above-described apparatus embodiments are only schematic, in which units described as separate components may or may not be physically separated, and the components shown as the units may or may not be physical units, that is, they may be located in one place or distributed over multiple network units. Some or all of the modules may be selected according to actual needs to achieve purposes of this embodiment. The embodiments may be understood and implemented by the ordinary skilled in the art without paying creative labor.

Various component embodiments disclosed herein may be implemented in hardware, or in software modules executed on one or more processors, or in a combination thereof. It should be understood by those skilled in the art that some or all of functions of some or all of the components in the computing processing device according to the embodiments of the present disclosure may be realized in practice by using a microprocessor or a digital signal processor (DSP). The present disclosure may also be implemented as device or apparatus programs (e.g., computer programs and computer program products) for performing part or all of the methods described herein. Such programs for realizing the present disclosure may be stored on a computer readable medium, or may be in a form of one or more signals. Such signals may be downloaded from Internet websites, or provided on carrier signals, or provided in any other form.

Figure 6:
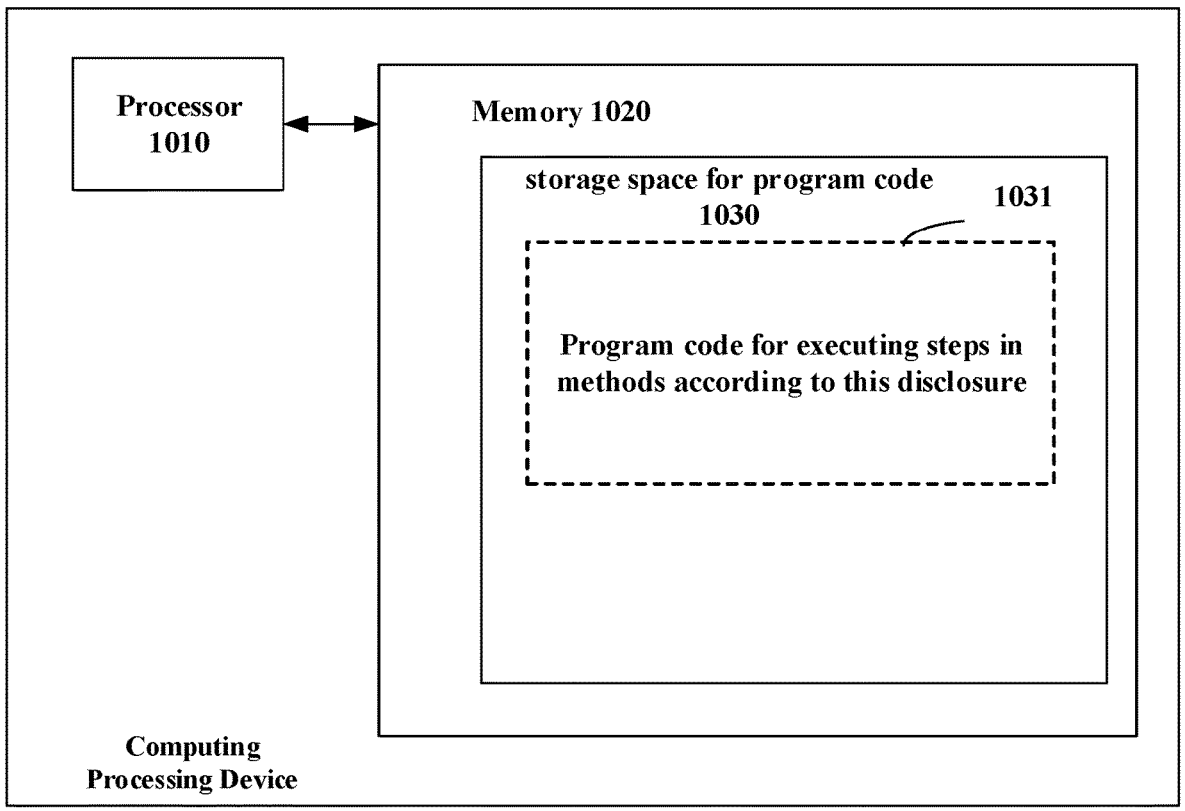
FIG. 6 schematically shows a block diagram of a computing processing device for executing the method according to the present disclosure.
Figure 7:
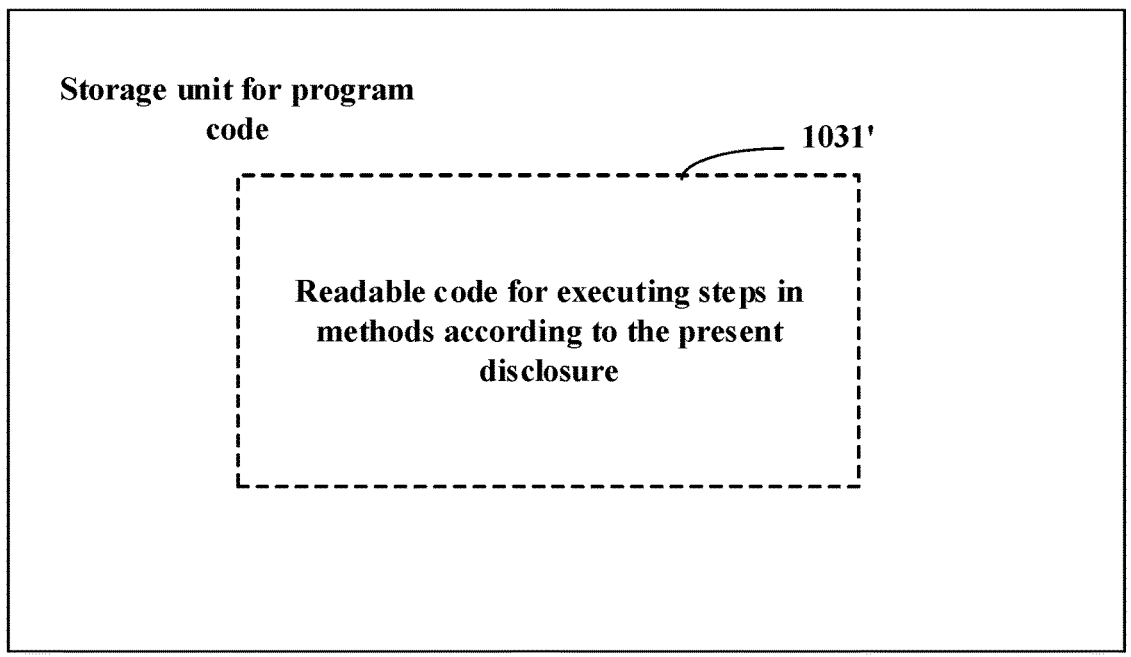
FIG. 7 schematically shows a storage unit for holding or carrying program codes for implementing the method according to the present disclosure.

For example, FIG. 6 shows a computing processing device that may implement the methods according to the present disclosure. The computing processing device conventionally includes a processor 1010 and a computer program product or a computer readable medium in a form of a memory 1020. The memory 1020 may be an electronic memory such as a flash memory, an EEPROM (electrically erasable programmable read only memory), an EPROM, a hard disk or a ROM. The memory 1020 has a storage space 1030 for program codes 1031 for executing any of steps in the above methods. For example, the storage space 1030 for program codes may include various program codes 1031 for implementing various steps in the above method, respectively. These program codes may be read from or written into one or more computer program products. These computer program products include program code carriers such as hard disks, compact disks (CD), memory cards or floppy disks. Such computer program products are usually portable or fixed storage units as described with reference to FIG. 7. The memory unit may have memory segments, memory spaces, and the like arranged similarly to the memory 1020 in the computing processing device of FIG. 6. The program may be compressed in an appropriate form, for example. Generally, the storage unit includes computer readable codes 1031', i.e., codes that may be read by, for example, a processor such as 1010, which, when executed by a computing processing device, causes the computing processing device to perform various steps in the methods described above.

The above description is only the preferred embodiments of the present disclosure, and it is not intended to limit the present disclosure. Any modification, equivalent substitution, improvement, etc. made within the spirit and principle of the present disclosure shall be encompassed within the protection scope of the present disclosure.

The invention claimed is:

1. A method for thermal management and control, comprising:
by one or more processors, when a vehicle is in an off-road condition, performing an adjusting step to improve heat dissipation performance of the vehicle;
wherein the adjusting step comprises at least one of steps as follows:
by one or more processors, reducing an overtemperature threshold of the vehicle, and the overtemperature threshold comprises at least one of a starting temperature threshold of an electronic thermostat, a starting temperature threshold of an electronic water pump, a response temperature threshold of a cooling fan and a response temperature threshold of a water pump in a low-temperature circuit for a high-voltage component; and
by one or more processors, acquiring an operating temperature of the vehicle and adjusting driving parameters of the vehicle according to the operating temperature, wherein the operating temperature comprises at least one of an outlet water temperature of an engine and an oil temperature of a gearbox, and the driving parameters comprises at least one of a duty cycle of the cooling fan, a gear of the gearbox and operating parameters of an air conditioning;
adjusting the driving parameters of the vehicle according to the operating temperature comprises at least one of:
according to the outlet water temperature of the engine, adjusting the duty cycle of the cooling fan;
according to the outlet water temperature of the engine, adjusting the gear of the gearbox;
according to the oil temperature of the gearbox, adjusting the gear of the gearbox; and
according to the outlet water temperature of the engine, adjusting the operating parameters of the air conditioning;
when the vehicle is in a conventional road condition, reversely performing the adjusting step to reduce the heat dissipation performance of the vehicle.

2. The method according to claim 1, wherein the step of adjusting the driving parameters of the vehicle according to the operating temperature comprises:
when the outlet water temperature of the engine is less than or equal to a first temperature threshold, adjusting the duty cycle of the cooling fan to be a first duty cycle;
when the outlet water temperature of the engine is greater than the first temperature threshold and less than or equal to the second temperature threshold, adjusting the duty cycle of the cooling fan to be a second duty cycle which is greater than the first duty cycle and less than a maximum duty cycle; and
when the outlet water temperature of the engine is greater than the second temperature threshold, adjusting the duty cycle of the cooling fan to be the maximum duty cycle.

3. The method according to claim 1, wherein the step of adjusting the driving parameters of the vehicle according to the operating temperature comprises:
when the outlet water temperature of the engine is greater than a third temperature threshold and an engine of the vehicle is a mechanical water pump, lowering the gearbox gear.

4. The method according to claim 1, wherein the step of adjusting the driving parameters of the vehicle according to the operating temperature comprises:

when the oil temperature of the gearbox is greater than or equal to a fourth temperature threshold, lowering the gearbox gear.

5. The method according to claim 1, wherein the operating parameters of the air conditioning comprise internal circulation, and the step of adjusting the driving parameters of the vehicle according to the operating temperature comprises:
when the outlet water temperature of the engine is greater than or equal to a second temperature threshold, controlling the air conditioning of the vehicle to be in internal circulation.

6. The method according to claim 1, wherein the operating parameters of the air conditioning comprise an outlet temperature of an evaporator, and the step of adjusting the driving parameters of the vehicle according to the operating temperature comprises:
when the outlet water temperature of the engine is greater than or equal to a second temperature threshold, increasing the outlet temperature of the evaporator by a preset temperature value.

7. The method according to claim 1, wherein the adjusting step further comprises:
when the vehicle is equipped with an Active Grille Shutter, adjusting an opening of the Active Grille Shutter to a maximum opening.

8. An apparatus for thermal management and control, one or more processors and a storage apparatus; and
the storage apparatus stores a computer program which, when executed by the processor, perform the operations comprising:
an off-road adjusting module configured for, when a vehicle is in an off-road condition, performing an adjusting step to improve heat dissipation performance of the vehicle;
wherein the adjusting step comprises at least one of steps as follows:
reducing an overtemperature threshold of the vehicle, and the overtemperature threshold comprises at least one of a starting temperature threshold of an electronic thermostat, a starting temperature threshold of an electronic water pump, a response temperature threshold of a cooling fan and a response temperature threshold of a water pump in a low-temperature circuit for a high-voltage component; and
acquiring an operating temperature of the vehicle, and adjusting driving parameters of the vehicle according to the operating temperature, wherein the operating temperature comprises at least one of an outlet water temperature of an engine and an oil temperature of a gearbox and the driving parameters comprises at least one of a duty cycle of the cooling fan, a gear of the gearbox and operating parameters of an air conditioning;
adjusting the driving parameters of the vehicle according to the operating temperature comprises at least one of:
according to the outlet water temperature of the engine, adjusting the duty cycle of the cooling fan;
according to the outlet water temperature of the engine, adjusting the gear of the gearbox;
according to the oil temperature of the gearbox, adjusting the gear of the gearbox; and
according to the outlet water temperature of the engine, adjusting the operating parameters of the air conditioning;
when the vehicle is in a conventional road condition, reversely performing the adjusting step to reduce the heat dissipation performance of the vehicle.

9. The apparatus according to claim 8, wherein the operation of adjusting the driving parameters of the vehicle according to the operating temperature comprises:
when the outlet water temperature of the engine is less than or equal to a first temperature threshold, adjusting the duty cycle of the cooling fan to be a first duty cycle;
when the outlet water temperature of the engine is greater than the first temperature threshold and less than or equal to the second temperature threshold, adjusting the duty cycle of the cooling fan to be a second duty cycle which is greater than the first duty cycle and less than a maximum duty cycle; and
when the outlet water temperature of the engine is greater than the second temperature threshold, adjusting the duty cycle of the cooling fan to be the maximum duty cycle.

10. The apparatus according to claim 8, wherein the operation of adjusting the driving parameters of the vehicle according to the operating temperature comprises:
when the outlet water temperature of the engine is greater than a third temperature threshold and an engine of the vehicle is a mechanical water pump, lowering the gearbox gear.

11. The apparatus according to claim 8, wherein the operation of adjusting the driving parameters of the vehicle according to the operating temperature comprises:
when the oil temperature of the gearbox is greater than or equal to a fourth temperature threshold, lowering the gearbox gear.

12. A vehicle, wherein the vehicle is equipped with the apparatus for thermal management and control according to claim 8.

13. A computer-readable medium, wherein the computer-readable medium stores a computer-readable code, and when the computer-readable code is executed, the method for thermal management and control according to claim 1 is performed.

14. The vehicle according to claim 12, wherein the step of adjusting the driving parameters of the vehicle according to the operating temperature comprises:
when the outlet water temperature of the engine is less than or equal to a first temperature threshold, adjusting the duty cycle of the cooling fan to be a first duty cycle;
when the outlet water temperature of the engine is greater than the first temperature threshold and less than or equal to the second temperature threshold, adjusting the duty cycle of the cooling fan to be a second duty cycle which is greater than the first duty cycle and less than a maximum duty cycle; and
when the outlet water temperature of the engine is greater than the second temperature threshold, adjusting the duty cycle of the cooling fan to be the maximum duty cycle.

15. The vehicle according to claim 12, wherein the step of adjusting the driving parameters of the vehicle according to the operating temperature comprises:
when the outlet water temperature of the engine is greater than a third temperature threshold and an engine of the vehicle is a mechanical water pump, lowering the gearbox gear.

16. The vehicle according to claim 12, wherein the step of adjusting the driving parameters of the vehicle according to the operating temperature comprises:
when the oil temperature of the gearbox is greater than or equal to a fourth temperature threshold, lowering the gearbox gear.

17. The vehicle according to claim 12, wherein the operating parameters of the air conditioning comprise internal circulation, and the step of adjusting the driving parameters of the vehicle according to the operating temperature comprises:

when the outlet water temperature of the engine is greater than or equal to a second temperature threshold, controlling the air conditioning of the vehicle to be in internal circulation.

18. The vehicle according to claim 12, wherein the operating parameters of the air conditioning comprise an outlet temperature of an evaporator, and the step of adjusting the driving parameters of the vehicle according to the operating temperature comprises:

when the outlet water temperature of the engine is greater than or equal to a second temperature threshold, increasing the outlet temperature of the evaporator by a preset temperature value.

19. The vehicle according to claim 12, wherein the adjusting step further comprises:

when the vehicle is equipped with an Active Grille Shutter, adjusting an opening of the Active Grille Shutter to a maximum opening.

20. The medium according to claim 13, wherein the step of adjusting the driving parameters of the vehicle according to the operating temperature comprises:

when the outlet water temperature of the engine is less than or equal to a first temperature threshold, adjusting the duty cycle of the cooling fan to be a first duty cycle;

when the outlet water temperature of the engine is greater than the first temperature threshold and less than or equal to the second temperature threshold, adjusting the duty cycle of the cooling fan to be a second duty cycle which is greater than the first duty cycle and less than a maximum duty cycle; and when the outlet water temperature of the engine is greater than the second temperature threshold, adjusting the duty cycle of the cooling fan to be the maximum duty cycle.

\* \* \* \* \*